April 28, 1936.                H. A. MacFARLANE                2,039,233
                                AUTOMOBILE BODY
                        Filed Feb. 12, 1936        2 Sheets-Sheet 2
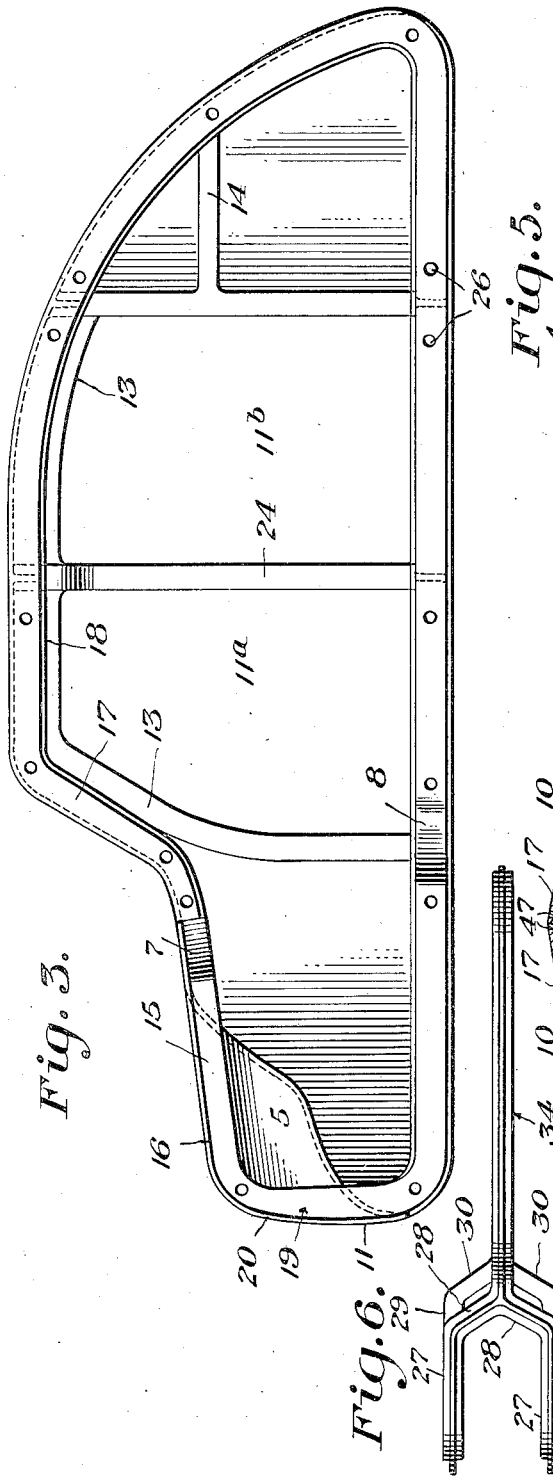
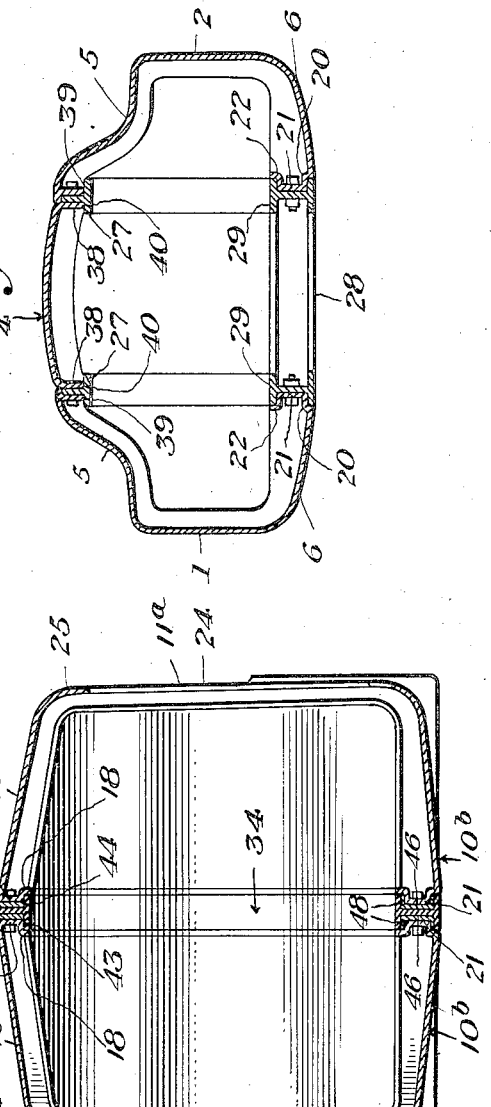
Inventor
Harry A. MacFarlane
Geo. P. Kimmel
      Attorney Patented Apr. 28, 1936

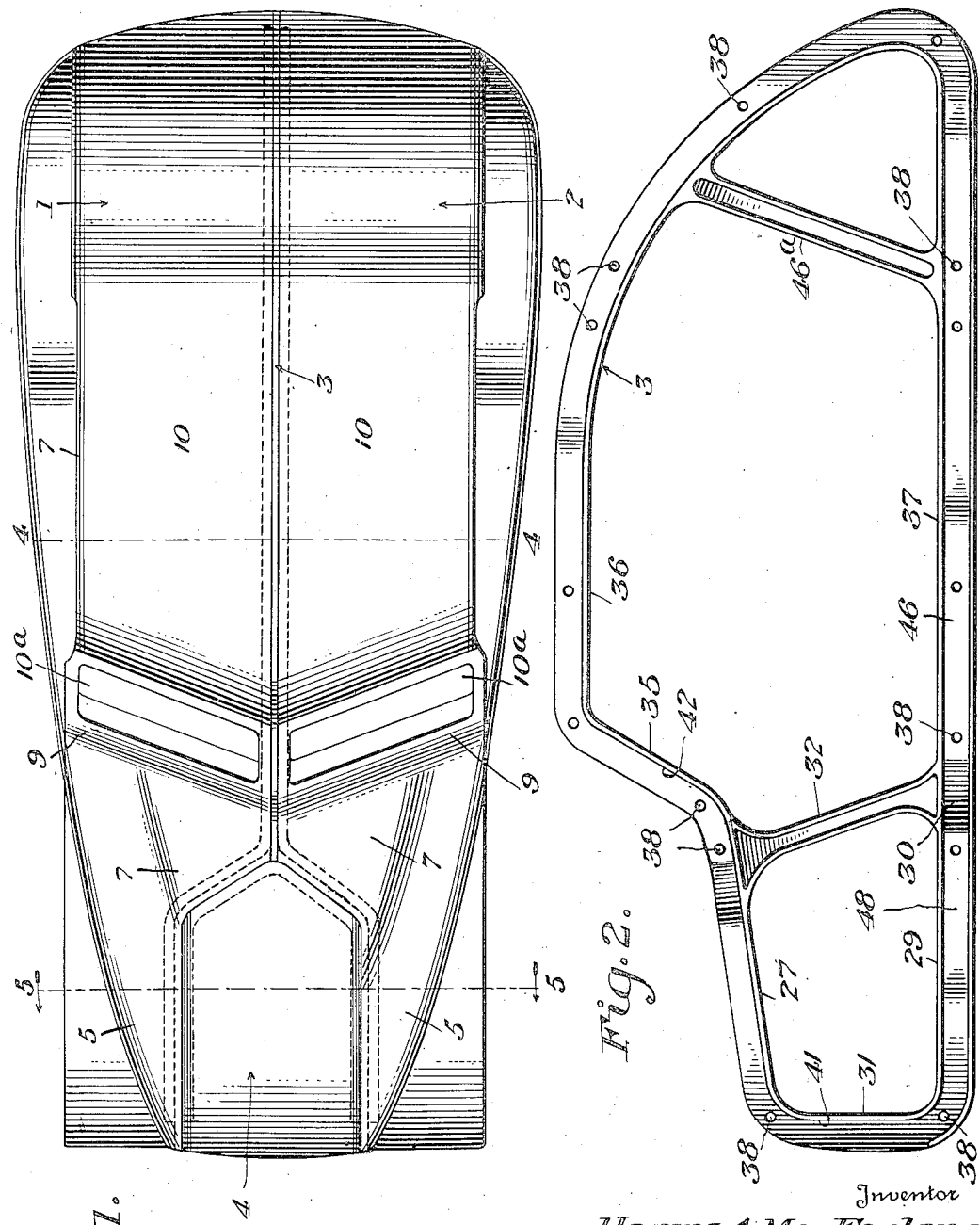

2,039,233

UNITED STATES PATENT OFFICE 2,039,233

AUTOMOBILE BODY

Harry A. MacFarlane, Marinette, Wis.

Application February 12, 1936, Serial No. 63,626

7 Claims. (Cl. 296—28)

This invention relates to improvements in vehicles, particularly the bodies of automobiles of closed body type.

The object of the invention is to provide, in a manner as hereinafter set forth, an improved form of an automobile body of the closed type, giving amongst its many advantages lightness of weight with adequate strength and low cost of production.

A further object of the invention is to provide, in a manner as hereinafter set forth, a shell-like automobile body of the closed type including a series of stamped or cast metallic sections of the desired form for connection together to set up the body.

A further object of the invention is to provide, in a manner as hereinafter set forth, a shell-like metallic body including stamped or cast side sections detachably secured in position when forming parts of an automobile body whereby if the automobile is damaged on one side only, such side may be removed and an undamaged one readily substituted to overcome the necessity of discarding the entire body.

A further object of the invention is to provide, in a manner as hereinafter set forth, a shell-like metallic body formed from a series of suitably connected together stamped or cast sections and with the sections providing the side of the body being so formed for connecting therewith the front and rear fenders of the automobile.

A further object of the invention is to provide, in a manner as hereinafter set forth, a shell-like metallic sectional automobile body of the closed type having a low center of gravity.

Further objects of the invention are to provide, in a manner as hereinafter set forth, a sectional shell-like metallic automobile body of the closed type which is comparatively simple in its construction and arrangement, structure, durable, compact, readily assembled, thoroughly efficient in use for the purpose intended thereby and comparatively inexpensive to manufacture.

With the foregoing and other objects which may hereinafter appear, the invention consists of the novel construction, combination and arrangement of parts as will be more specifically described and are as illustrated in the accompanying drawings, wherein is shown an embodiment of the invention, but it is to be understood that changes, variations, and modifications may be resorted to which fall within the scope of the invention as claimed.

In the drawings:—

Figure 1 is a top plan view of an automobile body of the closed type, in accordance with this invention, Figure 2 is a side elevation of the center section of the body, Figure 3 is an elevation looking towards the inner side of a side section of the body, Figure 4 is a section on line 4—4 Figure 1, Figure 5 is a section on line 5—5 Figure 1, and Figure 6 is a top plan view of the central section.

An automobile body of the closed type, in accordance with this invention includes a pair of side sections 1, 2, a central section 3 and a front section 4. The sections may be stamped or cast from any suitable metallic material. The sections of the body are suitably secured together when set up to provide the body. The sections 1, 2 are of like form, oppositely disposed relatively to each other, hollow and open at their inner sides.

Each side section is of the shape desired and as illustrated has the forward part of its top and its bottom, indicated at 5, 6 of less width than the remaining portions thereof. The top and the bottom of the side section has a portion gradually increasing in width rearwardly as indicated at 7, 8 respectively. The top of the side section is formed with an upstanding rearwardly inclined portion 9 which merges at its lower end into the portion 7. The top of each side section includes a rearwardly extending downwardly curved portion 10 of greater length than the portions 5, 7, and 9. The forward end of the portion 10 merges into the upper end of the portion 9. The rear end of the portion 10 merges into the rear end of the bottom 10ᵇ of the side section and the latter includes an upstanding front portion 11 which merges at its upper end into the forward end of the portion 5 and at its lower end into the forward end of the bottom of the side section. The parts 5 and 7 slope downwardly towards the outer side of the side section. Each side section consists of a forward low part, an intermediate high part and a rear part gradually decreasing in height from the rear end of the intermediate part. The part 9 of each side section is formed with an opening 10ᵃ for the reception of a window. The outer side of a side section is formed with a pair of spaced openings 11ᵃ, 11ᵇ for the reception of the doors. The outer side of each side section has the portions thereof bordering the top and the side of the openings 11ᵃ and 11ᵇ reinforced as at 13. The rear portion of each side section is braced as at 14. The side section rearwardly of the portion 9 has its outer side flared.

The top of each side section at its inner side is formed with a depending flange 15 which is inset with respect to the edge part 16. The flange 15 depends from the portions 5 and 7 of the top of the outer side section. The top of the inner side of each side section is formed with a depending flange 17 which is flush with the outer face of the top of the section. The flange 17 extends from the rear end of the portion 7 and throughout the portions 9 and 10 of the top of the side section. The flange 17 is formed at its inner side with an angle-shaped extension 18 co-extensive with the length of the flange 17. The forward end of the inner side of each side section is provided with an inwardly extending flange 19 which merges at its upper end into the flange 15 and is inset with respect to the edge part 20. The inner side of the bottom of each side section is formed with an angle-shaped extension 20 merging into a rail 21 which terminates at its upper end into an angle-shaped extension 22 arranged over and oppositely disposed with respect to extension 20. The extension 20 is formed integral with the upper face of the bottom 23 of an outer side section. The outer side wall of each side section has as a part thereof a spacing or reinforcing bar 24 which is common to and forms a wall of the openings 11ᵃ and 11ᵇ. The outer side wall of each side section is indicated at 25, the flanges 15, 17 and rails 21 are provided with openings 26 for the passage of hold-fast devices.

The central section 3 is in the form of a yoke or fork having projecting from its closed end a stem. The yoke consists of a pair of oppositely disposed top stretches, each including a pair of branches 27, 28 disposed in angular relation and with the branch 28 of one top stretch merging into the branch 28 of the other top stretch. The branches 28 are integral with and extend inwardly from the rear ends of the branches 27. The yoke also includes a pair of oppositely disposed lower stretches each consisting of a pair of branches 29, 30 arranged in angular relation. The branches 30 of one bottom stretch merge into the branch 30 of the other bottom stretch. The branches 30 extend inwardly from the rear ends of the branches 29. The forward end of a branch 27 is connected to the forward end of a branch 29 by an upstanding stretch 31. The point of mergence of the branches 28 has formed integral therewith a brace 32 which merges at its lower end into the point of mergence of the branches 30. The brace 32 inclines forwardly from its lower end. The lower stretches of the yoke extend rearwardly with respect to the upper or top stretches thereof. The stretches 27 are of inverted T-shape in vertical section. The stretches 31 are of inverted T-shape in sectional plan. The stretches 28 are of inverted T-shape in vertical section. The stretches 29 and 30 are of I-shape in vertical section to provide channels. The yoke or fork of section 3 is generally indicated at 33.

The stem of section 3 is generally indicated at 34 and it includes an upstanding rearwardly inclined forward top stretch 35 of inverted T-shape cross section merging at its lower end into the stretches 28 and brace member 32, a rearwardly extending downwardly inclined rear top stretch 36 of inverted T-shape cross section merging at its forward end into the upper end of the stretch 35. A bottom stretch 37 of I-shape cross section, providing channels and merging at its forward end into the point of mergence of the branches 30 and at its rear end into the lower end of the stretch 36. The stretches of the section 3 are provided with openings 38 for the passage of hold-fast devices to secure the central section 3 to the sections 1, 2.

The section 4 constitutes a cover for the engine of the automobile and it is of angle-shaped contour. The section 4 is formed with inwardly extending flanges 38. The section 4 is to be mounted within the fork of the section 3 and hinged to the fork.

Each branch 27 provides a pair of seats 39, 40. Each stretch 31 provides a pair of seats 41 only one of which is shown. The stretch 35 provides a pair of seats 42 only one of which is shown. The stretch 36 provides a pair of seats 43, 44. The branches 29, 30 provide channels 45. The stretch 37 provides channels 46 which merge into the channels 45.

When each side section is arranged relative to the central section 3, the flange 15 is mounted against seat 39, flange 19 against a seat 41, flange 17 against a seat 43 or 44, extension 18 on flange 17 overlaps the seat 43 or 44, and rail 21 is seated in a channel 45 or 46. When in the position as stated the side sections will be disposed in parallel abutting relation to the central section and the said side sections and central sections are suitably secured together by hold-fast means.

When assembling the body, after the sections 1, 2 and 3 have been assembled the section 4 is mounted between the branches 27, 28 and the flanges thereof are mounted on seat 40 and also thereagainst flanges 41. The section 4 includes a top portion and a front portion depending relative to the top portion and said front portion is hinged in any suitable manner to the stretches 31.

The section 3 includes an inclined brace member 46ᵃ integral with the stretches 36, 37.

Fillers 47 are interposed between the tops of sections 1, 2 and the stretch 36 of section 3. Fillers 48 are interposed between the bottoms of sections 1, 2 and the stretch 37 of section 3. When the sections 1, 2 and 3 are detachably connected together the connecting means for such purpose extend through the fillers.

The outer side of each side section at its front and rear is formed in a suitable manner to have the fenders of the vehicle anchored thereto.

Although it is stated that the side sections are stamped or cast it is to be understood that they may be fabricated or formed in any manner desired.

The structure as shown is particularly appropriate for a front wheel drive, but it may be used for a rear wheel drive, and in this connection, the rearward bottom portion of the central section 3 may be made of two parallel parts to allow for the passage of the drive shaft. The central section 3 may be made, with such variations as might be necessary, to permit of placing the drive shaft at the level desired.

It is to be understood that the invention does not limit itself to any special design or contour of body or placing of windows, doors or other apertures but that the invention is claimed to be applicable to all styles of bodies and that openings for doors, windows and the like might be placed at any desired points and be appropriately ribbed for strength, convenience, etc.

What I claim is:

1. An automobile body including a pair of pre-shaped parallel oppositely disposed flared hollow side sections of like form open at their inner sides, the forward portion of each of said sections being of less width than the remaining portion thereof, and a pre-shaped central section of frame-like form interposed between and abutting said side sections and adapted to be anchored to said side sections, said central section including a yoke of skeleton form and a stem of skeleton form, said yoke being arranged between the said portions of less width of the said side sections, and the said stem being arranged between the said remaining portions of the side sections.

2. The invention as set forth in claim 1, having each of said side sections provided intermediate its ends and in proximity to its reduced forward portion with an upstanding rearwardly inclined part formed transversely thereof with a rectanguler opening, and each of said side sections having its outer side formed with a pair of spaced vertically disposed openings.

3. The invention as set forth in claim 1, having the inner side of the top, front and rear of each side section formed with inwardly extending flanges and the inner side of the bottom of each side section formed with an upstanding rail provided at its top and bottom with angle-shape extensions, and said central section having its yoke and stem provided with seats for said flanges and its bottom formed with channels to receive said rails.

4. An automobile body including a pair of pre-shaped parallel oppositely disposed flared hollow side sections of like form open at their inner sides, the forward portion of each of said sections being of less width than the remaining portion thereof, and a pre-shaped central section of frame-like form interposed between and abutting said side sections and adapted to be anchored to said side sections, said central section including a yoke of skeleton form and a stem of skeleton form, said yoke being arranged between the said portions of less width of the said side sections, and the said stem being arranged between the said remaining portions of the side sections, and a pre-shaped shiftable front section of angled contour mounted in the top and front of and bearing against said yoke.

5. The invention as set forth in claim 4, having each of said side sections provided intermediate its ends and in proximity to its reduced forward portion with an upstanding rearwardly inclined part formed transversely thereof with a rectangular opening, and each of said side sections having its outer side formed with a pair of spaced vertically disposed openings.

6. The invention as set forth in claim 4, having the inner side of the top, front and rear of each side section formed with inwardly extending flanges and the inner side of the bottom of each side section formed with an upstanding rail provided at its top and bottom with angle-shape extensions, and said central section having its yoke and stem provided with seats for said flanges and its bottom formed with channels to receive said rails.

7. The invention as set forth in claim 1, having the side sections and central section formed with alined spaced openings for the passage of holdfast devices for detachably connecting the said several sections in abutting relation, and the said central section being formed with upper and lower means for respectively supporting upper lengthwise portions of the inner sides of said side sections and for receiving lower lengthwise portions of the inner sides of the said side sections.

HARRY A. MacFARLANE.